US012794232B2

(12) United States Patent
Schneider et al.

(10) Patent No.: US 12,794,232 B2
(45) Date of Patent: Nov. 10, 2026

(54) ELECTRIC POWER SYSTEMS, CONTROL SYSTEMS AND ASSOCIATED OPERATIONAL METHODS

(71) Applicant: Battelle Memorial Institute, Richland, WA (US)

(72) Inventors: Kevin P. Schneider, Seattle, WA (US); Xueqing Sun, Richland, WA (US); Francis K. Tuffner, Shoreline, WA (US); Wei Du, Richland, WA (US); Marcelo A. Elizondo, Seattle, WA (US); Jing Xie, Bellevue, WA (US)

(73) Assignee: Battelle Memorial Institute, Richland, WA (US)

( * ) Notice: Subject to any disclaimer, the term of this patent is extended or adjusted under 35 U.S.C. 154(b) by 616 days.

(21) Appl. No.: 18/124,777

(22) Filed: Mar. 22, 2023

(65) Prior Publication Data

US 2023/0307909 A1 Sep. 28, 2023

Related U.S. Application Data

(60) Provisional application No. 63/322,819, filed on Mar. 23, 2022.

(51) Int. Cl.
*H02J 3/06* (2026.01)
*H02J 13/12* (2026.01)
*H02J 103/35* (2026.01)

(52) U.S. Cl.
CPC ................ *H02J 3/06* (2013.01); *H02J 13/12* (2026.01); *H02J 2103/35* (2026.01)

(58) Field of Classification Search
USPC ................................ 700/286, 291, 295–296
See application file for complete search history.

(56) References Cited

U.S. PATENT DOCUMENTS 8,478,452 B2 7/2013 Pratt et al.
2008/0046387 A1* 2/2008 Gopal .................... H02J 3/008 705/412
2020/0021133 A1* 1/2020 Liu .......................... H02J 3/12

OTHER PUBLICATIONS

Cao et al., "A Risk-Averse Conic Model for Networked Microgrids Planning with Reconfiguration and Reorganizations", IEEE Transactions on Smart Grid, vol. 11, No. 1, Jan. 2020, United States, pp. 696-709.

(Continued)

*Primary Examiner* — Sean Shechtman
(74) *Attorney, Agent, or Firm* — Wells St. John P.S.

(57) ABSTRACT

Electric power systems, control systems and associated operational methods are described. According to one aspect, an electric power system includes plural load controllers that are configured to control the supply of electrical energy from the system to plural loads, a control system that determines an amount of power in reserve and available to be provided to the electric power system, uses the determined amount of power in reserve to determine different values for a plurality of setpoints that correspond to a parameter of electrical energy that is supplied by the system to the loads, and the load controllers monitor the parameter of the electrical energy that is supplied by the system with respect to the setpoint values and to adjust an amount of the electrical energy that is supplied from the electric power system to the loads as a result of the monitoring of the parameter by the load controllers.

30 Claims, 8 Drawing Sheets

(56) References Cited

OTHER PUBLICATIONS

Chen et al., "Networked Microgrids for Grid Resilience, Robustness, and Efficiency: A Review", IEEE Transactions on Smart Grid, vol. 12, No. 1, 2020, United States, 15 pages.
Cummins Inc, "Diesel Generator Set KTA38 Series Engine", Specification Sheet, 2022, United States, 4 pages.
Du et al., "A Comparative Study of Two Widely Used Grid-Forming Droop Controls on Microgrid Small Signal Stability", IEEE Journal of Emerging and Selected Topics in Power Electronics, vol. 8, No. 2, Jun. 2020, United States, 13 pages.
Du et al., "Modeling of Grid-Forming and Grid-Following Inverters for Dynamic Simulation of Large-Scale Distribution Systems", IEEE Transactions on Power Delivery, vol. 36, No. 4, Aug. 2021, United States, pp. 2035-2045.
Eaton, "Voltage Regulator Manual", available online at https://www.eaton.com/content/dam/eaton/products/medium-voltage-power-distribution-control-systems/voltage-regulators/vr-32-and-ever-tap-voltage-regulator-instructions-mn225008en.pdf, Jan. 2023, 52 pages.
Elizondo et al., "Simulation of Inrush Dynamics for Unbalanced Distribution Systems using Dynamic-Phasor Models", IEEE Transactions on Power Systems, vol. 32, No. 1, 2017, United States, 10 pages.
Elizondo et al., "Three-Phase Unbalanced Transient Dynamics and Powerflow for Modeling Distribution Systems With Synchronous Machines", IEEE Transactions on Power Systems, vol. 31, No. 1, 2016, United States, 11 pages.
Eto et al., "Frequency Control Requirements for Reliable Interconnection Frequency Response", Lawrence Berkley National Laboratory Technical Report LBNL 2001103, Feb. 2018, United States, 116 pages.
Eto et al., "Use of Frequency Response Metrics to Assess the Planning and Operating Requirements for Reliable Integration of Variable Renewable Generation", Lawrence Berkeley National Laboratory Technical Report LBNL-4142E, Dec. 2010, United States, 130 pages.
Farrokhabadi et al., "Microgrid Stability Definitions, Analysis, and Examples", IEEE Transactions on Power Systems, vol. 35, No. 1, Jan. 2020, United States, pp. 13-29.
Fitzgerald et al., "Electric Machinery", Sixth Edition, McGraw Hill, 2003, United States, 702 pages.
Hammerstrom et al., "Pacific Northwest GridWise™ Testbed Demonstration Projects, Part II. Grid Friendly™ Appliance Project", Pacific Northwest National Laboratory, Oct. 2007, United States, 106 pages.
IEEE, "IEEE Standard for Interconnection and Interoperability of Distributed Energy Resources with Associated Electric Power Systems Interfaces", IEEE Std 1547-2018, Feb. 2018, United States, pp. 1-138.
Jauch, "Possible Effects of Smart Grid Functions on LTC Transformers", IEEE Transactions on Industry Applications, vol. 47, No. 2, Mar. 2011, United States, pp. 1013-1021.
Kalsi et al., "Load as a Resource Frequency Responsive Demand", PNNL-23764, Pacific Northwest National Laboratory, 2014, United States, 47 pages.
Kundur, "Power System Stability and Control", McGraw-Hill, 1994, United States, 1195 pages.
Lasseter et al., "CERTS Microgrid Laboratory Test Bed", IEEE Transactions on Power Delivery, vol. 26, No. 1, Jan. 2011, United States, pp. 325-332.
Lasseter, "MicroGrids", IEEE Pes Winter Meeting, 2002, United States, pp. 305-308.
Lian et al., "Improved Controller Design of Grid Friendly™ Appliances for Primary Frequency Response", IEEE Pes General Meeting, 2015, United States, 5 pages.
Lu et al., "Design Considerations for Frequency Responsive Grid FriendlyTM Appliances", IEEE PES Transmission and Distribution Conference and Exhibition, 2006, United States, 6 pages.
Lu et al., "Grid FriendlyTM Appliances—Load-Side Solution for Congestion Management", IEEE PES Transmission and Distribution Conference and Exhibition, 2006, United States, 5 pages.
Melton, "Pacific Northwest Smartgrid Demonstration Project 2012 Annual Report", Pacific Northwest National Laboratory, 2012, United States, 16 pages.
Neplan AG, "Turbine-Governor Models Standard Dynamic Turbine-Governor Systems in NEPLAN Power System Analysis Tool" Neplan V555, available online at http://www.neplan.ch/wp-content/uploads/2015/08/Nep_TURBINES_GOV.pdf, Jan. 2023, 99 pages.
Nerc, "Automatic Underfrequency Load Shedding", Standard PRC-006-2, available online at https://www.nerccom/pa/Stand/ Reliability%20Standards/PRC-006-2.pdf, Dec 2019, 39 pages.
Nerc, "Contingency Reserve", Western Electricity Coordinating Council (WECC) Standard BAL-002-WECC-2a, available online at https://www.nerc.com/layouts/15/PrintStandard.aspx?standardnumber=BAL-002-WECC-2a&title=Contingency%20Reserve&Jurisdiction=United%20States, Apr. 2022, 14 pages.
Nerc, "Fast Frequency Response Concepts and Bulk Power System Reliability Needs", NERC Inverter-Based Resource Performance Task Force (IRPTF) White Paper, available online at https:// www.nerc.com/comm/PC/InverterBased%20Resource%20Performance%20Task%20Force%20 IRPT/Fast_Frequency_Response_Concepts_and_BPS_Reliability_Needs_White_Paper.pdf, Mar. 2020, 29 pages.
Nikkhajoei et al., "Distributed Generation Interface to the CERTS Microgrids", IEEE Transactions on Power Delivery, vol. 24, No. 3, Jul. 2009, United States, pp. 1598-1608.
OpenFMB Users Group, "OpenFMB.io Repositories", available online at https://openfmb.gitlab.io/, Apr. 2022, 1 page.
S&C Electric Company, "Voltage Regulator Manual", available online at https://www.sandc.asia/globalassets/sac-electric/documents/sharepoint/documents--all-documents/instruction-sheet-841-500.pdf?dt=637822676372763383, Mar. 2015, 16 pages.
Schneider et al., "Enabling Resiliency Operations Across Multiple Microgrids with Grid Friendly Appliance Controllers", IEEE Transactions on Smart Grid vol. 9, No. 5, Sep. 2018, United States, pp. 4755-4764.
Schneider et al., "Evaluating the Feasibility to Use Microgrids as a Resiliency Resource", IEEE Transactions on Smart Grid, vol. 32, No. 1, 2017, United States, 10 pages.
Schneider et al., "A Distributed Power System Control Architecture for Improved Distribution System Resiliency", IEEE Access, vol. 7, No. 1, Jan. 2019, United States, pp. 9957-9970.
Schneider et al., "A Framework for Coordinated Self-Assembly of Networked Microgrids using Consensus Algorithms", IEEE Access, vol. 10, Jan. 2022, United States, pp. 3864-3878.
Schneider et al., "Adaptive Dynamic Simulations for Distribution Systems using Multi-State Load Models", IEEE Transactions on Smart Grid, vol. 10, No. 2, Jan. 2019, 10 pages.
Schneider et al., "Analytic Considerations and Design Basis for the IEEE Distribution Test Feeders", IEEE Transactions on Power Systems, vol. 33, No. 3, May 2018, United States, pp. 3181-3188.
Schneider et al., "Evaluating the Magnitude and Duration of Cold Load Pick-Up on Residential Distribution Feeders Using Multi-State Load Models", IEEE Transactions on Power Systems, vol. 31, No. 5, Sep. 2016, United States, pp. 3765-3774.
Schneider et al., "Improving Primary Frequency Response to Support Networked Microgrid Operations", IEEE Transactions on Power Systems, vol. 34, No. 1, Jan. 2019, United States, pp. 659-667.
Schneider et al., "Networked Microgrid Operations: Supporting a Resilient Electric Power Infrastructure", IEEE PES Electrification Magazine, vol. 8, No. 4, Dec 2020, United States, pp. 70-79.
Schneider et al., U.S. Appl. No. 63/322,819, filed Mar. 23, 2022, titled "Distributed Control Architecture to Engage End-Use Loads (GFAS) as a Flexible Operating Resource in Primary Frequency Resource", 19 pages.
Siemens, "MJ-5(TM) Voltage Regulator Control Panel", Installation and Operations Manual, 2014, United States, 108 pages.
Smallwood et al., "Managing Renewable and DERs with Open Field Message Bus", DistribuTECH, Jan. 2018, United States, 6 pages.

* cited by examiner

ELECTRIC POWER SYSTEMS, CONTROL SYSTEMS AND ASSOCIATED OPERATIONAL METHODS

RELATED PATENT DATA

This application claims the benefit of U.S. Provisional Patent Application Serial No. 63/322,819, filed Mar. 23, 2022, titled "Distributed Control Architecture to Engage End-Use Loads (GFAS) as a Flexible Operating Resource in Primary Frequency Resource," the disclosure of which is incorporated herein by reference.

STATEMENT AS TO RIGHTS TO INVENTIONS MADE UNDER FEDERALLY-SPONSORED RESEARCH AND DEVELOPMENT

This invention was made with Government support under Contract DE-AC05-76RL01830 awarded by the U.S. Department of Energy. The Government has certain rights in the invention.

TECHNICAL FIELD

This disclosure relates to electric power systems, control systems and associated operational methods.

BACKGROUND OF THE DISCLOSURE

Distribution systems of electric power systems around the world are experiencing rapid change due to the accelerating deployment of distributed energy resources (DERs), control technologies, changing business models, and regulatory policies. These changes are transforming distribution system planning and operations as systems move from being passive and static to active and dynamic.

Microgrids and networks of microgrids represent an example of an active and dynamic technology being deployed at the distribution level. Microgrid technologies have existed since the earliest industrial electric power systems, but the rate of their deployment is accelerating due to improved inverter controls and distributed control architectures.

As a result of distribution systems becoming more active and dynamic, it is not always practical to use traditional controls that rely on static system conditions. A simple example of this is the mis-operation of legacy tap changing voltage regulators when power flow direction is reversed. Regardless of whether the reversal of power flow is due to a topological reconfiguration or changes in output of distributed energy resources (DERs), it can result in the voltage regulator operating to the end tap limits. While the issue of voltage regulators operating in a reverse power condition can be addressed with currently available commercial solutions, this is representative of how controls that make assumptions of static system conditions, i.e., unidirectional power flow, lack the operational flexibility to support modern systems.

At least some aspects of the disclosure are directed towards electric power systems, control systems and associated operational methods that monitor the electric power systems and adaptively respond to changes within the electric power systems.

BRIEF DESCRIPTION OF THE DRAWINGS

Example embodiments of the disclosure are described below with reference to the following accompanying drawings.

DETAILED DESCRIPTION OF THE DISCLOSURE

Figure 1:
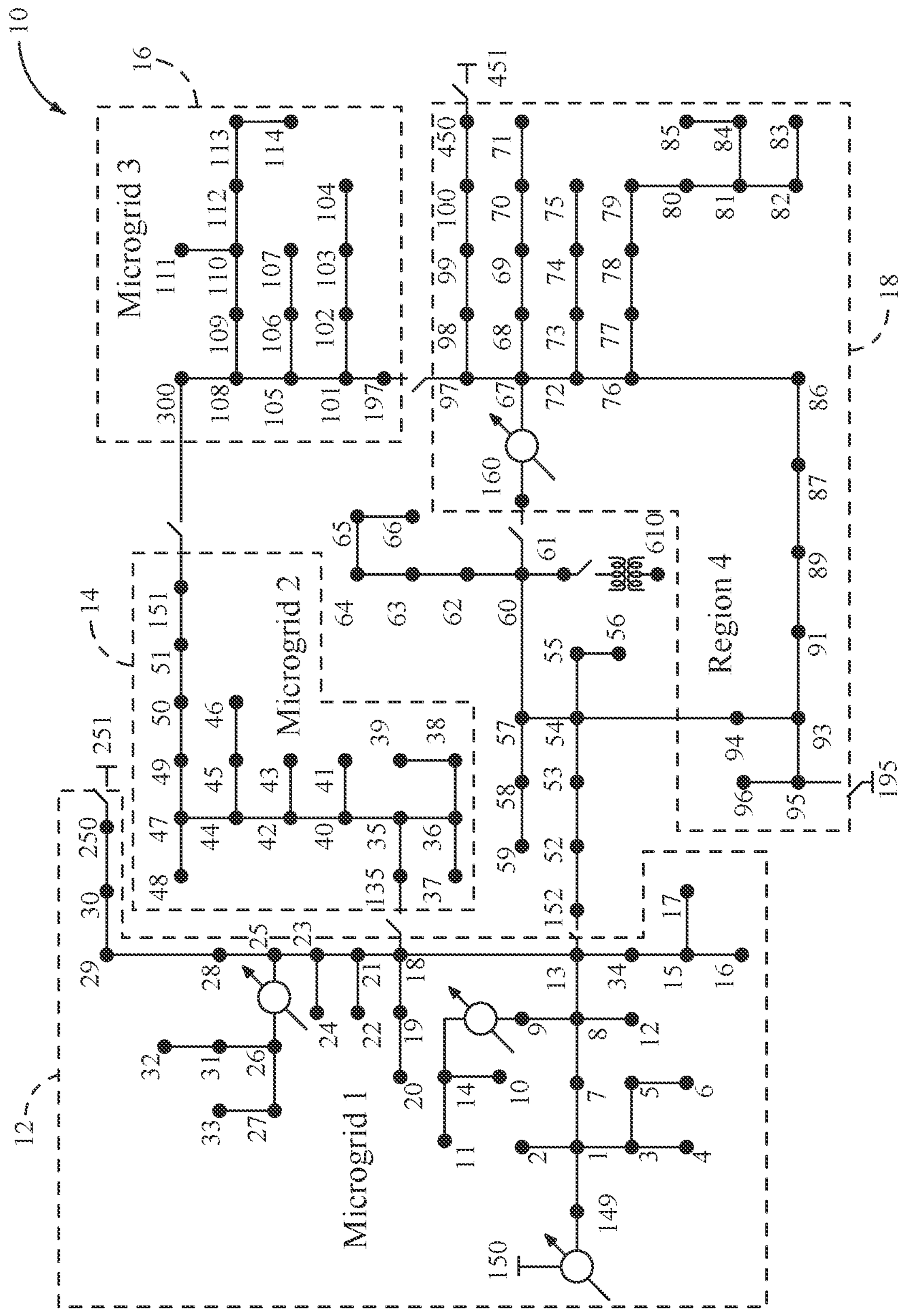
FIG. 1 is a one-line diagram of an electric power system according to one embodiment.

This disclosure is submitted in furtherance of the constitutional purposes of the U.S. Patent Laws "to promote the progress of science and useful arts" (Article 1, Section 8).

Aspects of the present disclosure are directed to electric power systems, control systems and associated operational methods. Some aspects are directed towards implementing primary frequency response (PFR) for electric power systems including microgrids, for example.

A microgrid is a subsection of a distribution system that can provide its own generation and meet its local load and has controls to regulate frequency and voltage. Typically, a microgrid is 10 MW or less but may be could also be larger in some embodiments. Two or more microgrids may have the ability to network and interconnect together, conduct electrical energy between the connected microgrids, supply electrical energy to respective loads coupled with the microgrids, and operate as a single larger microgrid, for example in the presence of a black out in a transmission system.

Because of the complexity of microgrid operations, operational flexibility is even more important, not just in voltage control, but also in frequency control, because of the lack of a strong substation voltage source and the resultant system dynamics. Coordination of primary frequency response is one operational concern for microgrid operations where there is no strong substation voltage source. In addition, reconfiguring of microgrids changes the system impedance, power flows, and the mix of generation sources, all of which will impact the effectiveness of primary frequency response.

When grid connected, microgrids can provide a range of services to the bulk power system. In this configuration, a substation transformer provides a relatively stiff voltage source and system dynamics are typically not a planning nor operational concern. During islanded operations, the lack of a stiff voltage source results in larger frequency and voltage deviations during transients, especially during switching operations due to inrush. Switching transients for microgrid operations can be more extreme than simple paralleling operations because of the need to energize de-energized line sections, and their associated loads, between microgrids.

Switching operations are central to the coordinated operation of microgrids when not connected to the bulk power system. When energizing a portion of an electric power system, the associated switching operations will result in a current inrush that is dependent on the amount of load energized, the number of transformers energized, and the extent to which the transformer cores are saturated. Due to the lack of a strong central voltage source when islanded, the inrush current will cause frequency and voltage transients. The magnitude of the frequency and voltage transients will be dependent on the magnitude of the transients, including any inrush effects, the amounts of rotating inertia, reserves available for primary frequency response, and the capabilities of the speed control governors and voltage regulators. Additionally, the magnitude of a transient will be affected if any of the distributed resources trip off-line during the transient.

Primary frequency response has traditionally been associated with the inertia and controls of rotating machines. Some newer electric power systems including some microgrid deployments are all-inverter based microgrids that rely on a combination of fast frequency response (FFR) and PFR instead of inertia. FFR is the injection of active power during an arresting period of a transient while PFR is a sustained injection that persists into the recovery period. Both grid-forming and grid-following inverters have the potential to provide FFR, and grid-forming inverters, with overhead, may provide sustained active power injections to provide PFR.

Instead of rotating inertia, grid-forming inverters utilize fast switching, the energy stored in their internal DC bus, and the energy source that they are connected in order to rapidly respond to changes in system frequency. As a result, grid-forming inverters can support a system without any rotating inertia, defined as a critical inertia of zero by the North American Electric Reliability Corporations (NERC). Grid-forming inverters typically cannot provide sustained fault level current due to thermal limitations and internal control loops, however they may rapidly change their output to provide PFR to system transients without any rotating inertia in some embodiments. A challenge for microgrid operations is to maintain coordination of the primary frequency response with other controls as the electric power system reconfigures and the mix of generation sources continually changes over time.

For individual stand-alone microgrid operations, frequency is typically regulated either by a set of coordinated rotating machines, a single large inverter based resource, or by a local dispatch from a microgrid controller. These approaches are based on the fact that a single stand-alone microgrid has a limited number of operational states compared to networked microgrid operations. In microgrid operations, all possible scenarios are difficult to define in advance due to the mix of generation sources, topology, and operational state.

In some embodiments of electric power systems disclosed herein, a plurality of load controllers may be associated with a plurality of loads of the system. These load controllers are configured to monitor one or more parameters of electrical energy, such as frequency or voltage, upon the electric power system and to selectively adjust the amount of power that is supplied to their associated loads based on the monitoring of the parameters as discussed below. In some embodiments, the load controllers are configured to use switching circuitry to selectively turn off the supply of power to the respective loads (also referred to as shedding load), for example to provide primary frequency control. In some embodiments, the load controllers are able to shed their loads within 80 milliseconds of a detected under-frequency or under-voltage event.

As discussed in example embodiments below, the load controllers have associated setpoints that correspond to one or more parameters of electrical energy of the electric power system being monitored by the load controllers. For example, if a parameter of the electrical energy being monitored triggers a setpoint value for a given load controller, the load controller may respond by adjusting the amount of power that is supplied from the electric power system to a load that is associated with the load controller as a result of the monitoring of the parameter triggering the setpoint value of the load controller. Examples of triggering a setpoint value of the load controller include the system frequency or system voltage dropping below values of the setpoints.

In some more specific example embodiments, the electric power system is configured to adaptively set the values of the load controller setpoints (e.g., frequency and/or voltage) at a plurality of moments in time, for example on a continuous basis during operations of the electric power system. In some embodiments, the incomplete beta function is used as an analytic basis for determining the values of the setpoints for a population of load controllers of an electric power system at different moments in time based on current operational conditions of the electric power system at the different moments in time.

According to some embodiments discussed below, response curves of the population of load controllers are generated using the incomplete beta function as a basis to best reflect the current amount of power in reserve that is available for primary frequency control at the different moments in time. The engagement of load shedding by the load controllers in some embodiments may be minimized while frequency deviations are maintained within a desired range as microgrid operations reconfigure and/or dispatch the system.

According to some embodiments, a communications system is utilized to exchange information regarding generation and/or load of individual nodes of the electrical power system as well as communicate setpoint values to the load controllers to implement adjustments of the supply of power to the loads coupled therewith. Information exchange between devices is accomplished peer-to-peer at the application layer using the distributed architecture of Open Field Message Bus (OpenFMB) in some example embodiments discussed below.

Referring to FIG. 1, an example embodiment of an electric power system 10 is shown according to one embodiment. The depicted system 10 includes a first microgrid 12, a second microgrid 14, a third microgrid 16 and a region 18 that each include a plurality of numbered nodes that may each correspond to either a load, generation source, or both (e.g., a rechargeable battery). The illustrated system 10 is a modified IEEE 123-Node Test System.

Microgrids 12, 14, 16 are stable, self-regulating and may have the ability to selectively network together where the microgrids 12, 14, 16 are selectively connected to one another to conduct electrical energy therebetween in some embodiments. Region 18 includes a high penetration of photovoltaic generation nodes but without the ability to independently form a stable microgrid on its own. Region 18 may potentially be energized from one of the microgrids 12, 14, 16. Although not shown in FIG. 1, electric power system 10 includes a control system to monitor operations and parameters of the system 10 and control adjustments in the amounts of power provided from the system 10 to a plurality of loads as discussed in some embodiments below.

A plurality of distributed energy resources (DERs) of the system 10 are included in Table A and indicate which microgrid 12, 14, 16 they are located in, which node they are connected to, the rated apparent power of the generation source, and the controller type of the generation source.

TABLE A

| Generator (#) | Microgrid/Region (#) | Node (#) | Rating (kVA) | Controller Type (kVA) |
|---|---|---|---|---|
| G1 | 1 | 150 | 1000 | GGOV1 |
| G2 | 1 | 250 | 1,000 | Grid-forming |
| G3 | 2 | 50 | 1,000 | GGOV1 |
| G4 | 2 | 135 | 150 | Grid-following |
| G5 | 2 | 151 | 100 | Grid-following |
| G6 | 3 | 300 | 450 | GGOV1 |
| G7 | 3 | 197 | 600 | GGOV1 |
| G8 | 3 | 105 | 120 | Grid-following |
| G9 | 3 | 108 | 60 | Grid-following |
| G10 | Region 4 | 86 | 1,500 | Grid-following |

Generators utilize device level control for stable operation and these can include controls on rotating machines, grid-following inverters, and grid-forming inverters, for example. Modern diesel generators above 100 kVA are typically equipped with proportional—integral—derivative (PID) type speed controls and high speed PID-type controls enable effective regulation for lower inertia units. The commonly used GGOV1 model for a generator speed control governor is an example of the type of modern controllers that have replaced older electromechanical governors, such as the DEGOV1 governor model. The GGOV1 speed control governor was originally designed for gas turbine generators, however, with the correct settings, GGOV1 can be used to represent the controls of a modern PID controller for a diesel generator. The faster responses of the GGOV1 model allows lower inertia diesel generators to support transients that cannot be supported with older electromechanical governors such as DEGOV1. Generators also commonly use a voltage regulator (e.g., SEXS1) to control their field excitation.

Typical grid-following inverters use a phase-lock loop (PLL) to track the voltage angle of electrical energy of the system and utilize a stable voltage source for normal operation. While these inverters may provide FFR in some situations, they are typically deployed on photovoltaic (PV) arrays using maximum power point tracking (MPP) to maximize available power and leaving no headroom for PFR. In addition, during transient conditions the grid-following inverters "shall-trip" for abnormal frequencies and voltages.

Grid-forming inverters may operate independent of other voltage sources and have the ability to actively regulate frequency and voltage of electrical energy of the electric power system. Accordingly, grid-forming inverters with sufficient headroom have the ability to provide PFR.

Figure 2:
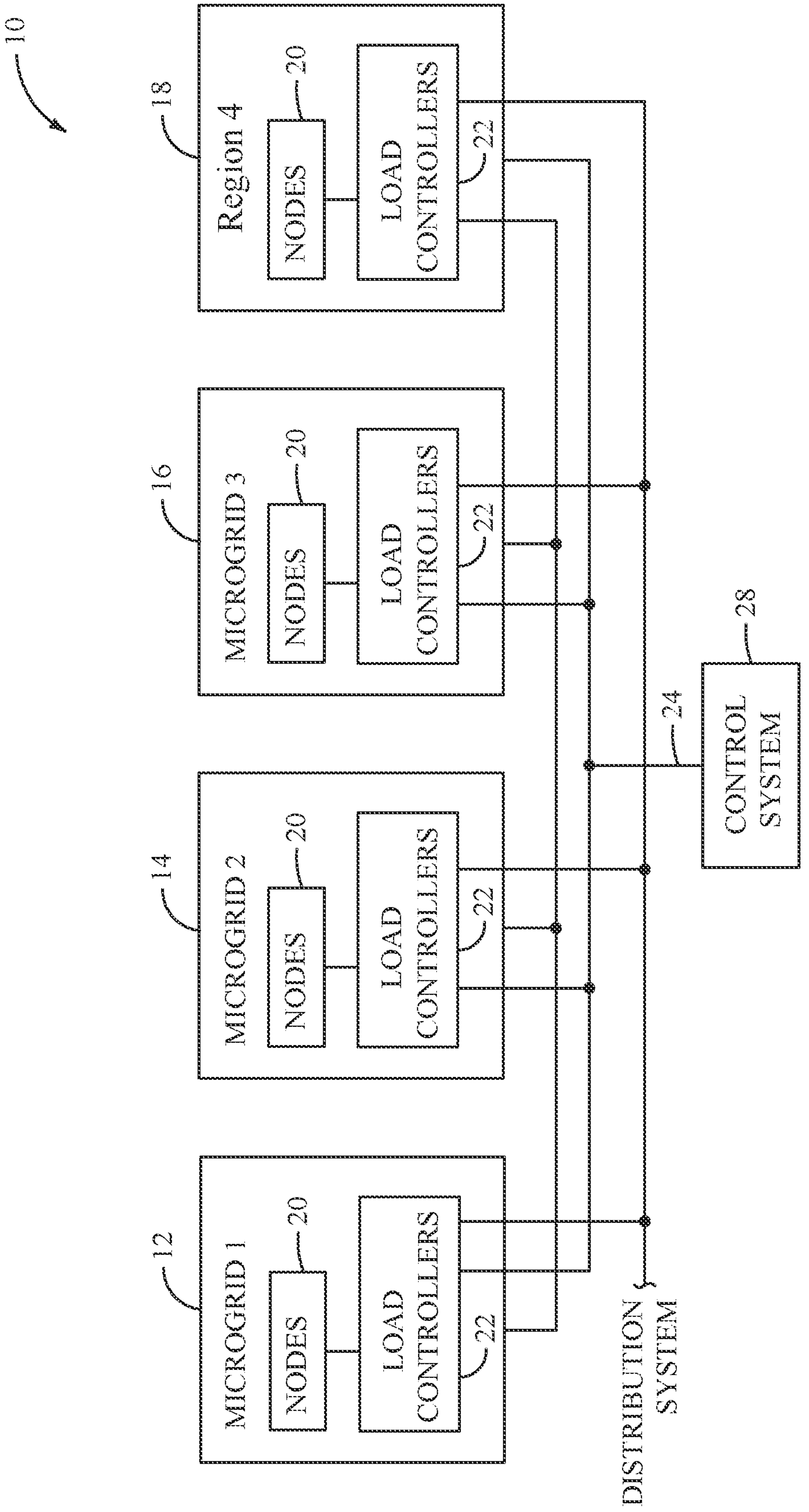
FIG. 2 is a functional block diagram of an electric power system according to one embodiment.

Referring to FIG. 2, a block diagram of components of an example electric power system 10 are shown according to one embodiment. The illustrated microgrids 12, 14, 16 and region 18 are networked and have the ability to be interconnected with one another and the distribution system of a utility. The microgrids 12, 14, 16 and region 18 have a plurality of nodes 20 (for example as arranged in FIG. 1) and a plurality of associated load controllers 22. The nodes 20 may each be a load, generation, both or neither and one of the load controllers 22 may be associated with one or more of the nodes 20 in a given arrangement. Load controllers 22 control amounts of power that are supplied to the associated loads to provide PFR according to some embodiments described below.

The system 10 also includes a communications system 24 that is configured to communicate data between the load controllers 22 and a central control system 28. In one embodiment, the communications system 24 is configured to ensure reliability and resiliency and to avoid a single point of failure and may be implemented using the reference architecture provided by Open Field Message Bus (OpenFMB). OpenFMB can implement a range of publish and subscribe (pub/sub) protocols such as data distribution services (DSS), the Neural Autonomic Transport System (NATS) messaging system, and message queuing telemetry transport (MQTT). Containerized applications operating on commercial-off-the-shelf (COTS) devices support connections to device hardware using protocols such as distributed network protocol 3 (DNP-3), American National Standards Institute (ANSI) C12 and Modbus. With this reference architecture, it is possible for each device to exchange information peer-to-peer at the application layer with a one-second interval. This allows connected devices to quickly identify system changes and to act and is sufficient to update values of setpoints of the load controllers 22 in high speed control in the loop systems, such as primary frequency response, as discussed below. In the described embodiment, OpenFMB is used to exchange information between the control system 28, generation sources or units of nodes 20 as well as to update values of setpoints of load controllers 22. Communications between devices on the system 24 is not needed for local load controllers 22 to operate but is used to distribute updates to setpoint values of the load controllers 22 as conditions of the electric power system 10 change.

Load controllers 22 are configured to monitor the respective nodes 20, for example, parameters of electrical energy at the nodes 20 (e.g., frequency and voltage), available headroom of nodes 20 that are generation sources and storage levels of nodes 20 that are batteries, and communicate the monitored data to one another and/or control system 28 via communications system 24. The communications system 24 communicates data regarding amounts of power in reserve at the microgrids to the control system in some embodiments.

As mentioned above, load controllers 22 are configured to control the supply of power from the electric power system 10 to loads coupled with the system 10. The load controllers 22 may be configured to adjust the amount of power that is supplied to the loads at different moments in time, including either increasing or decreasing the amount of power that is provided to the loads. In some embodiments, the load controllers 22 control the amount of power that is supplied to the loads as a result of monitoring of one or more parameters of the electrical energy that is supplied by the electric power system 10.

In addition, control system 28 may process received data (e.g., regarding available headroom) and communicate data back to the load controllers 22 via the communications system 24 as a result of the processing. In some embodiments, the data communicated from the control system 28 to the load controllers 22 via the communications system 24 configures or controls the operations of the load controllers 22. The communicated data from the control system 28 may include values of setpoints for the load controllers 22 and may be utilized by the load controllers 22 to control the operation of the associated nodes 20, for example shedding load to provide a level of primary frequency control. Load controllers 22 may either be deployed as extra functionality in the firmware of an existing device at a respective node 20 or included as additional hardware of the device at the node 20.

Control system 28 may be implemented in different arrangements in different embodiments of the system 10. In one embodiment, the control system 28 is implemented as a separate device or system from the microgrids 12, 14, 16 and region 18. In another embodiment, the control system 28 may be implemented using components of the microgrids, such as microgrid controllers (not shown in FIG. 2), that monitor and control operations of the respective microgrids 12, 14, 16. In another embodiment, the operations of the control system 28 may be implemented using one of the load controllers 22 and the control system 28 may be omitted.

Figure 3:
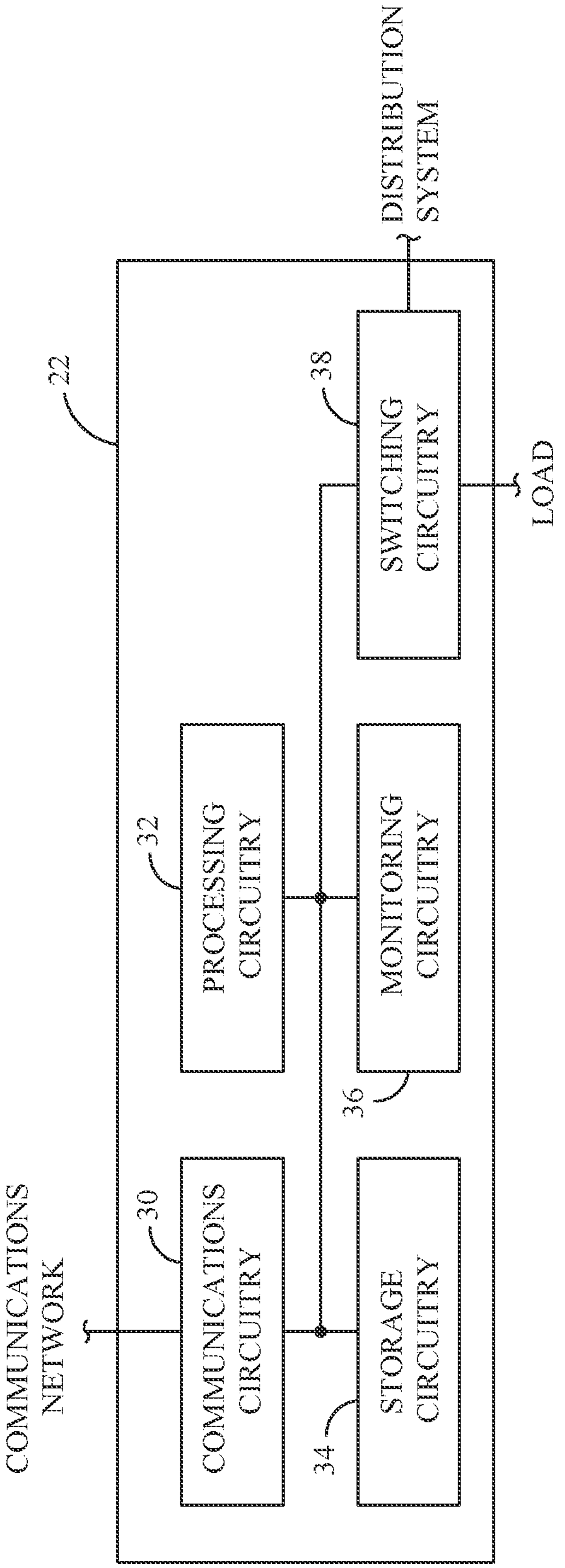
FIG. 3 is a functional block diagram of a load controller according to one embodiment.

Referring to FIG. 3, one embodiment of a load controller 22 is shown. The depicted load controller 22 includes communications circuitry 30, processing circuitry 32, storage circuitry 34, monitoring circuitry 36 and switching circuitry 38. Load controller 22 may include more, less and/or alternative components in other embodiments.

Communications circuitry 30 is configured to implement bi-directional communications with respect to other devices, such as other load controllers 22 and control system 28 via communications system 24. For example, communications circuitry 30 may output data resulting from the monitoring by monitoring circuitry 36 and receive data from the control system 28, such as values of setpoints that may be used to control operations of the switching circuitry 38 (e.g., adjusting an amount of power that is provided to a load, such as shedding load).

In one embodiment, processing circuitry 32 is arranged to process data, control data access and storage, issue commands, and control operations of system 10. Processing circuitry 32 may comprise circuitry configured to implement desired programming provided by appropriate computer-readable storage media in at least one embodiment. For example, the processing circuitry 32 may be implemented as one or more processor(s) and/or other structure configured to execute executable instructions including, for example, software and/or firmware instructions. Other example embodiments of processing circuitry 32 include hardware logic, PGA, FPGA, ASIC, state machines, and/or other structures alone or in combination with one or more processor(s). These examples of processing circuitry 32 are for illustration and other configurations are possible.

Storage circuitry 34 is configured to store programming such as executable code or instructions (e.g., software and/or firmware), data received via communications system 24, electronic data, databases, or other digital information and may include computer-readable storage media. At least some embodiments or aspects described herein may be implemented using programming stored within one or more computer-readable storage medium of storage circuitry 34 and configured to control appropriate processing circuitry 32.

Monitoring circuitry 36 is configured to monitor one or more aspect of an associated node 20. For example, the monitoring circuitry 36 may monitor one or more parameter (e.g., voltage, frequency, etc.) of electrical energy at the node 20. The monitoring circuitry 36 may monitor the operation of the node 20, for example for a generation source, the monitoring circuitry 36 may monitor available headroom, or state of charge of a node 20 in the form of a battery.

Switching circuitry 38 is coupled with a node 20 in the form of a load in the illustrated embodiment and is configured to selectively control the amount of power that is supplied to the load, for example, to implement load shedding as discussed herein. The switching circuitry 38 may be controlled by the processing circuitry 32 to increase or decrease the amount of power that is supplied from system 10 to an associated load of the respective node 20 as a result of a parameter of the electrical energy being monitored triggering a setpoint value of the load controller 22. Example triggering events are frequency or voltage of the electrical energy supplied by the system 10 dropping below or rising above setpoint values of the load controllers 22. For example, it is desired to maintain system frequency of the electric power system 10 at a fixed nominal value, such as 50 Hz or 60 Hz. During times of excessive load being present over an amount of generation, the system frequency (or system voltage) may drop below a desired value and load shedding may be used to attempt to raise the system frequency back to the desired nominal value.

The control system 28 of FIG. 2 may be configured similarly to the load controller 22 and include communications circuitry, processing circuitry, storage circuitry, and perhaps additional components such as a user interface for an operator.

As mentioned above, load shedding via the load controllers 22 participates in PFR and can support existing controls to avoid or prevent a complete collapse of the electric power system 10 in some embodiments. For systems 10 implemented as distribution systems or microgrids, load shedding is implemented at the sub-circuit level using load controllers 22 installed at the device level. Load controllers 22 locally sense parameters of the electrical energy of the system, such as frequency and voltage, as received at the locations of the load controllers 22 and are configured to interrupt or reduce the amount of power that is supplied to the load if measurements are outside of pre-set ranges determined by the setpoint values. Some load controllers 22 are configured to quickly shed respective loads when setpoints are tripped (e.g., within 80 milliseconds). When connected to loads with thermal mass (e.g., hot water heaters, hot tubs, etc.), load controllers 22 have been shown to be able to provide a number of services, including PFR, with minimal disruption to the end-use customers. It is also possible to use large numbers of load controllers 22 to provide PFR at the transmission level in some embodiments.

The values of the setpoints of the load controllers are set so that the aggregate response of all devices provides a desired frequency response of the electric power system 10 in example embodiments discussed below. As mentioned above, it is desired to maintain a desired constant frequency of electric energy of the electric power system at a nominal value, such as 50 Hz or 60 Hz. However, due to variations in generation and load, the frequency and/or voltage of the electrical energy may deviate from the desired frequency and/or voltage. The deviations may be more frequent and/or larger in islanded microgrids compared with microgrids that are connected to a bulk power system.

The values of the setpoints of the load controllers determine when the load controllers shed their respective loads in response to defined frequencies or voltages of the electrical energy upon the electric power system. The load controllers are programmed with different setpoint values to shed load at different frequencies to spread the load shedding and avoid shedding of the loads associated with the load controllers at a given frequency which may cause transients in the electric power system.

Four examples of setpoint distributions that provide varying frequency responses are shown in FIGS. 4A-4H. FIGS.

4A, 4C, 4E, and 4G are example frequency response curves that are cumulative responses of one hundred load controllers with associated distributions of setpoint values shown in FIGS. 4B, 4D, 4F, 4H, respectively.

Figure 4A:
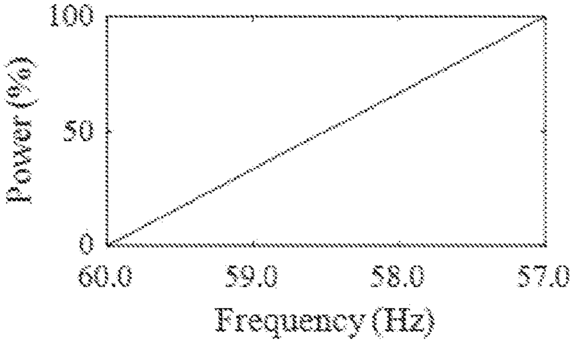
FIGS. 4A, 4C, 4E, and 4G are example frequency response curves according example embodiments.
Figure 4B:
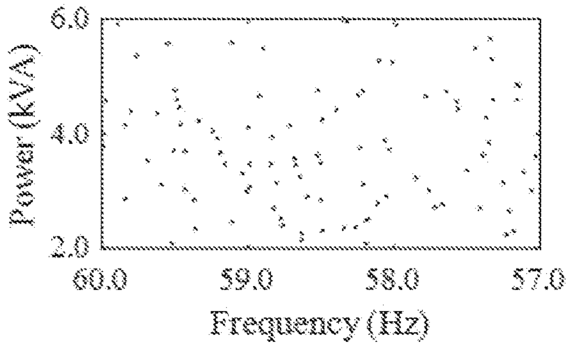
FIGS. 4B, 4D, 4F, and 4H are distributions of setpoints of a plurality of load controllers that correspond to FIGS. 4A, 4C, 4E, and 4G, respectively.
Figure 4C:
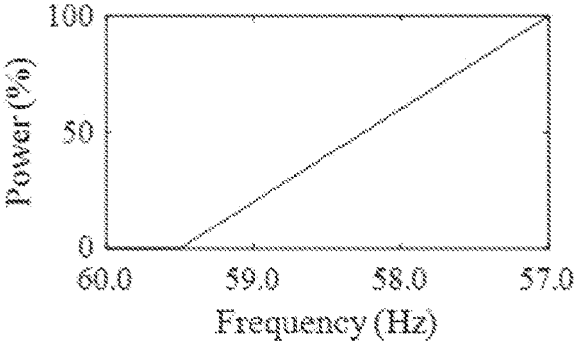
Figure 4D:
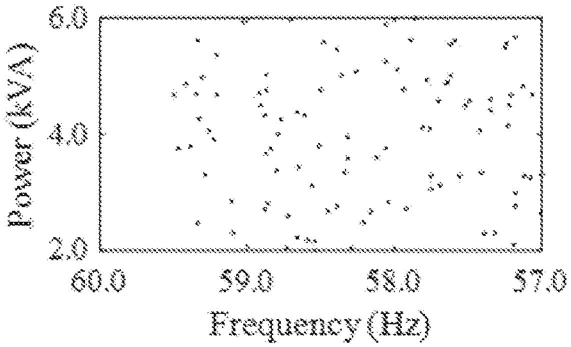

A example linear frequency response curve for a population of load controllers and the associated frequency setpoints for the load controllers are shown in FIGS. 4A and 4B, respectively. Similarly, FIGS. 4C and 4D show the same information except that the setpoint distribution, and thus the response curve, have a dead band from 60.0 Hz to 59.5 Hz. The use of a dead band may not be appropriate when a microgrid is connected to a bulk power system but may be used in other applications where frequency deviations may be larger (e.g., islanded microgrids).

Figure 4E:
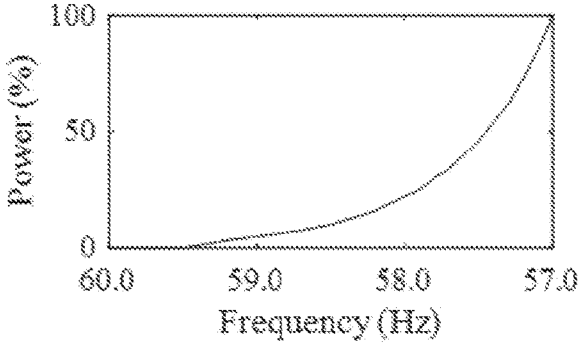
Figure 4F:
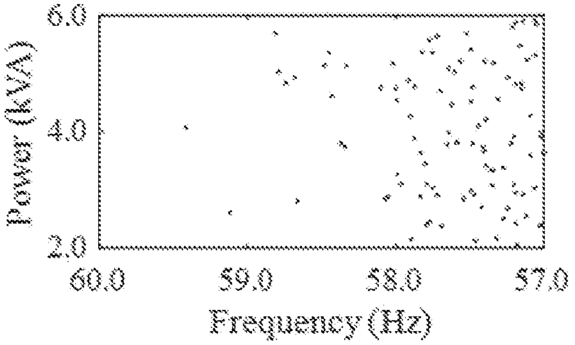
Figure 4G:
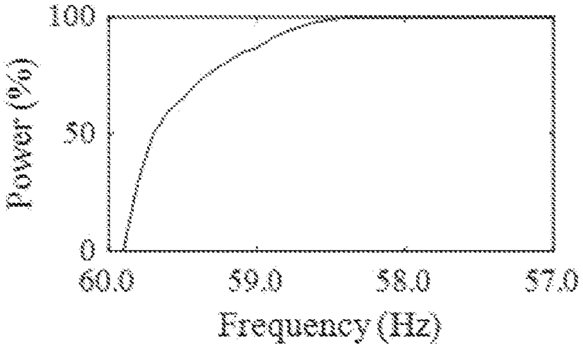
Figure 4H:
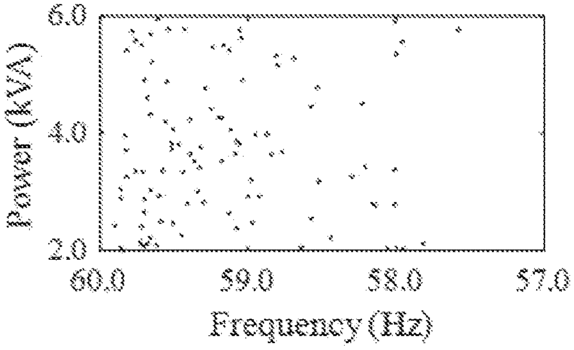

The use of non-linear distributions of values of load controller setpoints may also provide operational benefits. In particular, a less aggressive response to variations in frequency is shown in FIG. 4E with a right-biased distribution of setpoints shown in FIG. 4F where a first load controller responds (e.g., sheds an associated load) as a result in a drop in frequency of the electrical energy from 60 Hz to 59.5 Hz. A more aggressive response to variations in frequency is shown in FIG. 4G with an associated left-biased distribution of setpoints in FIG. 4H responding or shedding load as soon as frequency drops below 59.9 Hz.

The distribution of setpoints of the controllers may be selected so that the entire population of controllers provides a desired aggregate frequency response curve for typical operations of an electric power system, however a selected distribution of setpoint values may not provide a desired response for all possible operations of the electric power system 10 including combinations of microgrid operations. Specifically, incorrect setpoint values may lead to insufficient load shedding to ensure stability or result in excessive load shedding when not necessary.

According to some embodiments described herein, the values of the setpoints of the load controllers may be adaptively changed at different moments in time and according to operations of the electric power system. As described in example embodiments below, the control system of FIG. 2 performs a setpoint determination process at different moments in time during operations of the electric power system to determine the values of the setpoints of the load controllers to be used at the different moments in time and define the values of the monitored parameters when the load controllers shed associated loads.

In one embodiment, the process performed by the control system for determining values of setpoints of the load controllers has three primary acts. The first act determines the current amount of power that is in reserve and that is available to be provided to the electric power system for PFR. The amount of power in reserve is in addition to the power that is supplied by the electric power system to the loads at a given moment in time and may be calculated by determining the maximum amount of power capable of being generated and supplied to the electric power system at a given moment in time minus the amount of power being supplied to the loads that are coupled with the system at the given moment in time. The amount of power in reserve is determined using information collected via the communications system in one embodiment. In the second act, a response curve that represents a desired response of the electric power system from the population of load controllers is determined. The third act uses the determined or selected response curve from the second act to determine values of the setpoints for the load controllers, and to update the values of the setpoints in the load controllers via the communications system.

Accordingly, in some embodiments, the amount of power that is in reserve and available to be provided to the electric power system at a given moment in time is used to determine the values of the setpoints of the load controllers. The described process may be performed at different times to continually update the values of the setpoints based upon current operations of the electrical power system. In some embodiments, the setpoint values may be updated following significant changes to the electric power system, for example, after connection or disconnection of microgrids or regions with respect to one another, loss or addition of a generation source of power, and loss or addition of load. Additional details regarding the process for determining setpoint values for the load controllers are described below.

In the first step for determining values of the load controller setpoints, the control system determines the current reserves available in the electric power system to support or provide PFR as mentioned above. In particular, the setpoints of the load controllers may be selected to obtain the desired frequency response from the population of load controllers based on the current reserves available in the electric power system to provide or support primary frequency response (PFR). The control system receives information from the load controllers via the communications system 24 in order to determine the current reserves that are available to support PFR. In some embodiments, the control system is configured to use headroom of generation sources, a largest planned transient, and the loads of the electric power system to determine the amount of power in reserve, for example, as discussed below with respect to Equation 1.

In North American microgrids, reserves for primary frequency control differ from those at the bulk transmission level because they are not determined by North American Electric Reliability Corporation (NERC) standards. While transmission systems that operate as part of a balancing authority are required to follow BAL-003-2, a microgrid operator locally determines the reserves for primary frequency control. In some cases, a microgrid may operate at its maximum operating load with no reserves available. While operating with no reserves can be operationally challenging, it sometimes occurs because of the limited resources available within a microgrid.

Traditionally, reserves for PFR have been primarily provided by rotating machines. In many modern microgrids, grid-forming inverters have also been shown to be effective at providing PFR. In addition, it has been shown that an inverter-only system with a large percentage of grid-forming inverters can provide superior PFR compared to a traditional inertia-based system since the frequency nadir for a given transient will not be as low.

The described process develops a relationship between the reserves available for PFR and the largest planned transient. Reserves available for PFR may include both the spinning reserves of rotating machines and the headroom of grid-forming inverters. Grid-following inverters could be included in the current reserves calculations if they operated with headroom capability similar to grid-forming inverters. A largest transient on a microgrid electric power system is often the loss of the largest generating unit, the starting of the largest load, or a switching transient that energizes a section of the electric power system with load. The largest potential transient may also change during microgrid operations. Equation 1 is used in one embodiment to calculate a ratio $\gamma$ of the current amount of power in reserve that is available to the largest expected transient at a given moment in time.

$$\gamma = \frac{\text{Effective Current Reserves}}{\text{Effective Transient Size}} = \frac{W - X}{Y - Z} \quad \text{Eq. 1}$$

where:

W=the spinning reserves including current headroom of grid-forming inverters operating in a "synchronous inertia" mode (kVA)

X=current load of grid-following inverters that are IEEE Standard 1547 complaint (kVA)

Y=largest planned transient (kVA)

Z=current headroom of power electronic grid-forming inverters (kVA)

In the described embodiment, the current amount of power in reserve is calculated in Equation 1 as the total available spinning reserves (defined as headroom on rotating machines plus current headroom of grid-forming inverters operating in a synchronous inertia mode) minus the current amount load on IEEE standard 1547-compliant inverters. Equation 1 accounts for the most extreme case where the transient causes the loss of the inverters due to an under frequency and/or under voltage event of the electrical energy upon the electric power system. The transient size is calculated as the largest planned transient (e.g., step increase in load or loss of generation) minus the current available headroom on grid-forming inverters typically used with rechargeable batteries. The current headroom of grid-forming inverters Z is subtracted from the transient size because the inverter response, for non-synchronous inertia type resources, occurs in a few milliseconds. Equation 1 differentiates between the fundamentally different response times of rotating machines and inverters, but may also be expanded to represent other operational considerations if desired.

For larger values of $\gamma$ at a given moment in time, the reserves should be sufficient to meet the largest planned transient, and it should not be necessary to aggressively engage load shedding via the load controllers. For larger values of $\gamma$, a frequency response similar to that shown in FIG. 4E would be appropriate where load shedding is initially slow to engage and becomes more aggressive as the transient of system frequency becomes more severe. At the other end of the spectrum, if there are limited reserves available at a given moment in time, a low value of $\gamma$, then a more aggressive distribution of setpoints similar to those in FIG. 4G would be appropriate so that the load shedding via the load controllers may rapidly counteract the transient. In the described example embodiment, once the current reserves $\gamma$ that are available at a moment in time are determined, the calculated value of $\gamma$ is used to determine the appropriate shape of an aggregate load shedding response curve as discussed below.

In the second step of the setpoint determination process, an analytical method is used in one embodiment to model the desired aggregate load shedding response curve for the population of load controllers 22 in the electric power system 10. In the described example embodiment, a statistical distribution, including the beta distribution, and its cumulative distribution function (CDF), the regularized incomplete beta distribution, are utilized. Additional details regarding the beta distribution, and its cumulative distribution function (CDF), the regularized incomplete beta distribution are discussed in G. Casella, and R. L. Berger, Statistical Inference. 2nd ed. Cengage Learning 2021, the teachings of which are incorporated herein by reference.

In other embodiments, other functions may be used as the underling function, such as a sigmoid, as long as they are able to represent the range of response curves desired (i.e., other functions may be used if they represent the rate at which the load controllers are engaged to shed respective loads to support primary frequency response). The discussion proceeds below with respect to the beta distribution and the regularized incomplete beta distribution including modelling of the aggregate response curve using the regularized incomplete beta function.

The beta distribution is a family of continuous probability distributions defined on the interval [0, 1] and parameterized by two positive shape parameters, denoted by $\alpha$ and $\beta$ which are the probability and cumulative distribution functions and define the shapes of the response curves. The value of gamma ($\gamma$) is used to select the appropriate response curve defined by $\alpha$ and $\beta$ as discussed below.

The beta distribution has the probability density function (PDF) shown in Equation 2:

$$f(t;\alpha,\beta) = \frac{t^{\alpha-1}(1-t)^{\beta-1}}{B(\alpha,\beta)} \quad \text{Eq. 2}$$

$$t \in [0, 1], \alpha > 0, \beta > 0$$

$$\text{where } B(\alpha,\beta) = \int_0^1 t^{\alpha-1}(1-t)^{\beta-1}dt = \frac{\Gamma(\alpha)\Gamma(\beta)}{\Gamma(\alpha+\beta)},$$

and $\Gamma$ is the gamma function. $B(\alpha, \beta)$ is a constant for any given $\alpha$ and $\beta$.

The CDF for the beta distribution is called the regularized incomplete function, as shown in Equation 3. The CDF is used to represent the frequency response curves shown in FIGS. 4A-4H as discussed further below.

$$I(x;\alpha,\beta) = \frac{B(x;\alpha,\beta)}{B(\alpha,\beta)}, \alpha > 0, \beta > 0 \quad \text{Eq. 3}$$

where:

$$B(x;\alpha,\beta) = \int_0^x t^{\alpha-1}(1-t)^{\beta-1}dt, \quad \text{Eq. 4}$$

$$t \in [0, 1], x \in [0, 1]$$

One common application of the beta distribution is to model success rates within the domain [0, 1]. The shape of the PDF and CDF of a beta distribution can be determined by parameters $\alpha$ and $\beta$. Both the magnitudes of the parameters and their ratio determine the shape. In the described process, the values of $\alpha$ and $\beta$ are constrained so that $\alpha+\beta=2.0$, which yields response curves consistent with those shown in FIGS. 4A-4H. The mean of a success rate that follows the beta distribution as shown in Equation 5.

$$\frac{\alpha}{\alpha+\beta} = \frac{1}{1+\frac{\beta}{\alpha}} \quad \text{Eq. 5}$$

Figure 5B:
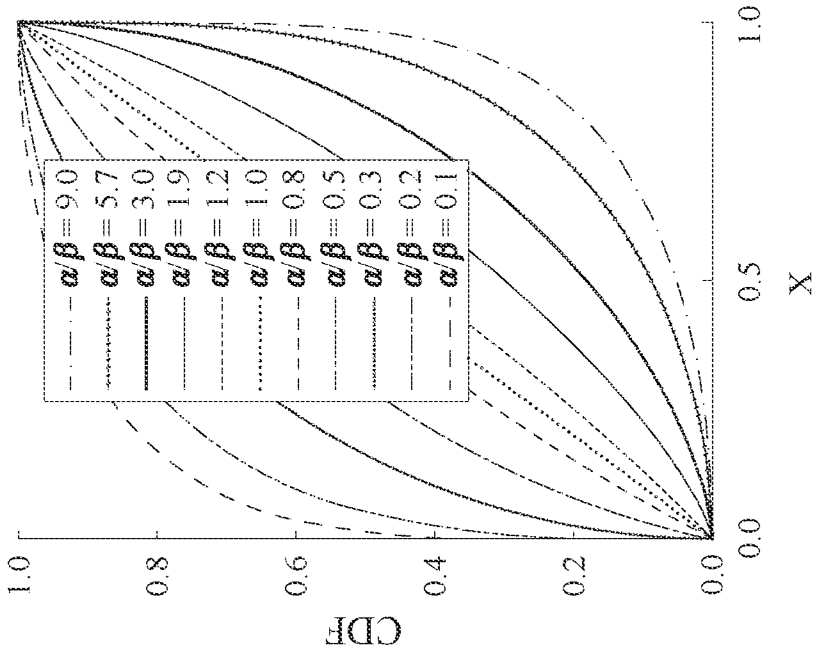
FIGS. 5A and 5B are graphical representations of a probability density function and a cumulative distribution function, respectively, of a beta function according to one embodiment.
Figure 5A:
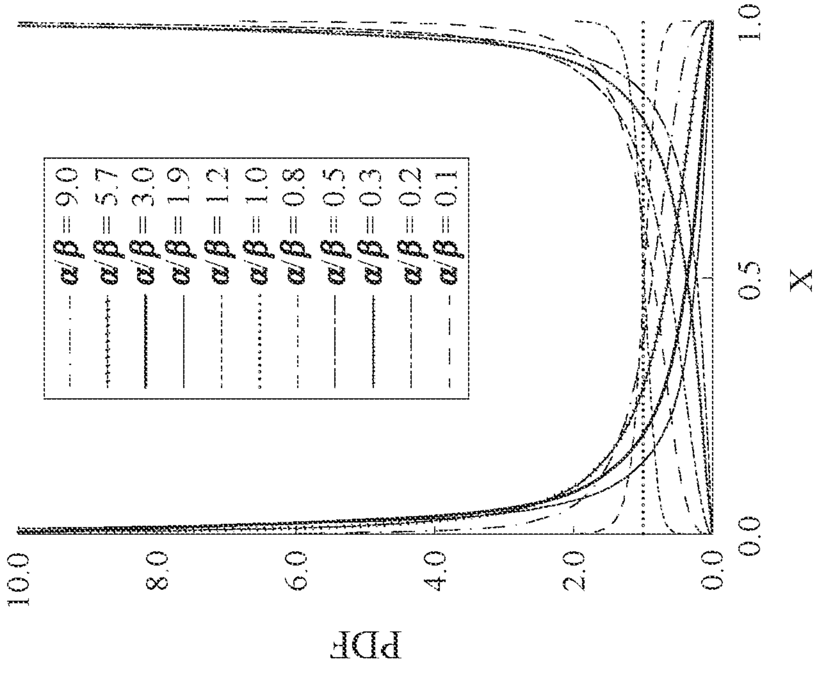

When the value of $\alpha/\beta$ increases, the mean increases, i.e., the bulk of the probability distribution shifts towards the right. When $\alpha/\beta$ decreases, the mean decreases, i.e., the bulk of probability distribution shift towards the left. As $\alpha/\beta \rightarrow \infty$, the mean approaches 1.0, which means the success rate approaches 1.0. As $\alpha/\beta \rightarrow 0.0$, the mean approaches 0.0, which means the success rate approaches 0.0. Several examples of the probability density function (PDF) the cumulative distribution function (CDF) for different values of $\alpha/\beta$ are shown in FIGS. 5A and 5B. Note that when $\alpha=1.0$ and $\beta=1.0$, a uniform distribution is achieved.

From FIG. 5B, it can be seen that, for a given x, the cumulative probability is lower with larger values of $\alpha$ and/or smaller $\beta$. Specifically, for larger values of $\alpha/\beta$, the passive response curve of FIG. 4E is obtained, and for smaller values the aggressive response curve of FIG. 4G is obtained.

The values of $\alpha/\beta$ in FIGS. 5A and 5B range from 0.1 to 9.0, which is not consistent with the range of values for $\gamma$ obtained using Equation 1. In one embodiment, the value of $\gamma$ determined by Equation 1 is mapped to a value of $\alpha/\beta$, ranging from 0.1 to 9.0 in FIGS. 5A and 5B to obtain the desired response curve shape and determine the setpoint values of the load controllers.

Approximate ranges for the value of $\gamma$ may be determined since sufficient reserve is provided to meet the largest planned transient. For values of $\gamma$ above 1.3, there is limited need for load shedding given the response time of modern generators. Values of $\gamma$ below 1.0 use some level of load shedding with a value of 0.0 indicating no reserves for PFR. A system operator may select a value of $\gamma$ at which load shedding begins to be engaged because operating a system with no reserves can be challenging. In one embodiment, the $\gamma$ is selected such that the load controllers are desired to be active participants when the value of $\gamma$ is greater than 0.5 and less than 1.3, however, other values may be used in other embodiments. A simple linear mapping of $\gamma$ from 0.5 to 1.3 to the range of $\alpha/\beta$ from 0.1 to 9.0 provides the relationship between the two in one embodiment. Although other mappings may be used in other embodiments, an example linear mapping is shown in Table B.

TABLE B

| $\gamma$ | $\alpha/\beta$ |
|---|---|
| 0.5 | 0.1 |
| 0.56 | 0.2 |
| 0.62 | 0.3 |
| 0.68 | 0.5 |
| 0.74 | 0.8 |
| 0.8 | 1.0 |
| 0.86 | 1.2 |
| 0.92 | 1.9 |
| 0.98 | 3.0 |
| 1.04 | 5.7 |
| 1.1 | 9.0 |

The parameters of the beta distribution are correlated to the characterization of electric power systems in terms of their total reserves available. For a given system, for a single load controller (and associated load) with a setpoint at x, if the frequency drops below x, the load is tripped off or shed and if the frequency stays above x, the load receives power from the system. For different system configurations, the probability that a given load controller will be tripped off or shed during a transient, with setpoint x, is different. This probability tends to be smaller for a system with adequate available reserves compared with a system with less available reserves.

For a given system, a high limit or value of the load controller setpoints is defined as $x_{upper}$ and a low limit or value of the load controller setpoints is defined as $x_{lower}$. The frequency of the high limit is selected to determine a dead band where no load controllers shed load (e.g., between 59.5 Hz-60 Hz) and the low limit is the frequency at which all load controllers should have been tripped and shed respective loads.

Figure 6:
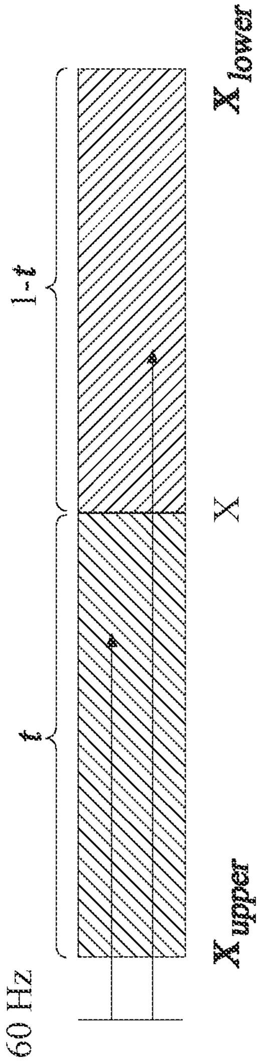
FIG. 6 is an illustrative representation of a load controller setpoint and a probability of system frequency above the setpoint.

Referring FIG. 6, for each load controller, the setpoint x is a number between $x_{upper}$ and $x_{lower}$, t is the probability that a controlled load stays connected (success event), and 1−t is the probability that the controlled load is tripped off or shed (failure event). The beta distribution is used to model the probability t as shown in Equation 2.

When there are adequate reserves available, the value of $\alpha/\beta$ is large so that bulk of the probability distribution shifts towards a higher success rate, as shown in FIGS. 5A and 5B where $\alpha/\beta=9.0$ corresponds to the passive response curve of FIG. 4E. When there are limited reserves available, values of $\alpha/\beta$ are small so the bulk of probability shift towards to high failure rates, as shown in FIGS. 5A and 5B where $\alpha/\beta=0.1$, corresponding to the aggressive response curve of FIG. 4G. The exact value of the ratio of alpha to beta (e.g., $\alpha/\beta$ for a system depends on the available reserves as calculated in Equation 1 and linearly mapped as discussed above.

The use of the different response curves and the determined setpoint values configures the load controllers to increase a reduction of the amount of the power that is supplied from the electric power system to the loads (i.e., increase load shed) for a given value of the parameter when less power is in reserve and available to be provided to the electric power system compared with times when an increased amount of power is in reserve.

In some embodiments, the normalized values shown in FIGS. 5A and 5B are adjusted to values that represent example load values and frequency ranges for load shedding operations. For any given setpoint x, a smaller value of $\alpha/\beta$ utilizes larger cumulative responses from load shedding compared with systems with larger values of $\alpha/\beta$. This relationship coincides with the shape of the cumulative probability of success rate ($I(x; \alpha,\beta)$), as seen in FIG. 5B. If the electric power system has substantial reserves (i.e., a large value of $\alpha/\beta$), the probability of failure (low success rates) is lower and responses of load shedding is lower. In one embodiment, the desired response curve corresponding to the value of $\alpha/\beta$ of Equation 1 is mapped to a desired frequency range (e.g., defined by $x_{upper}$ and $x_{lower}$) instead of a generic value of x [0, 1] in FIGS. 5A and 5B as discussed below.

Initially, the setpoint x is normalized using Equation 6:

$$x^* = \frac{x_{upper} - x}{x_{upper} - x_{lower}} \quad \text{Eq. 6}$$

where $x_{upper}$ is the high end of the frequency range and xlower is the lower end. This would correspond to 59.5 Hz and 57.0 Hz respectively for the example response curves shown in FIG. 4C, 4E and 4G.

Next, the aggregate load shedding responses y is modeled using Equation 7:

$$y = c_1 \times I(x^*; \alpha, \beta) \quad \text{Eq. 7}$$

where $I(x^*; \alpha, \beta)$ is the regularized incomplete beta function as defined in Equation 3, and $x^*$ is the normalized setpoints as in Equation 6. The value of $c_1$ is a constant determining the domain of $\gamma$, representing the total load connected via the load controllers. The values of a and are the parameters characterizing the system and are appropriate for the calculated gamma value y of available resources for PFR determined in Equation 1.

Figure 7:
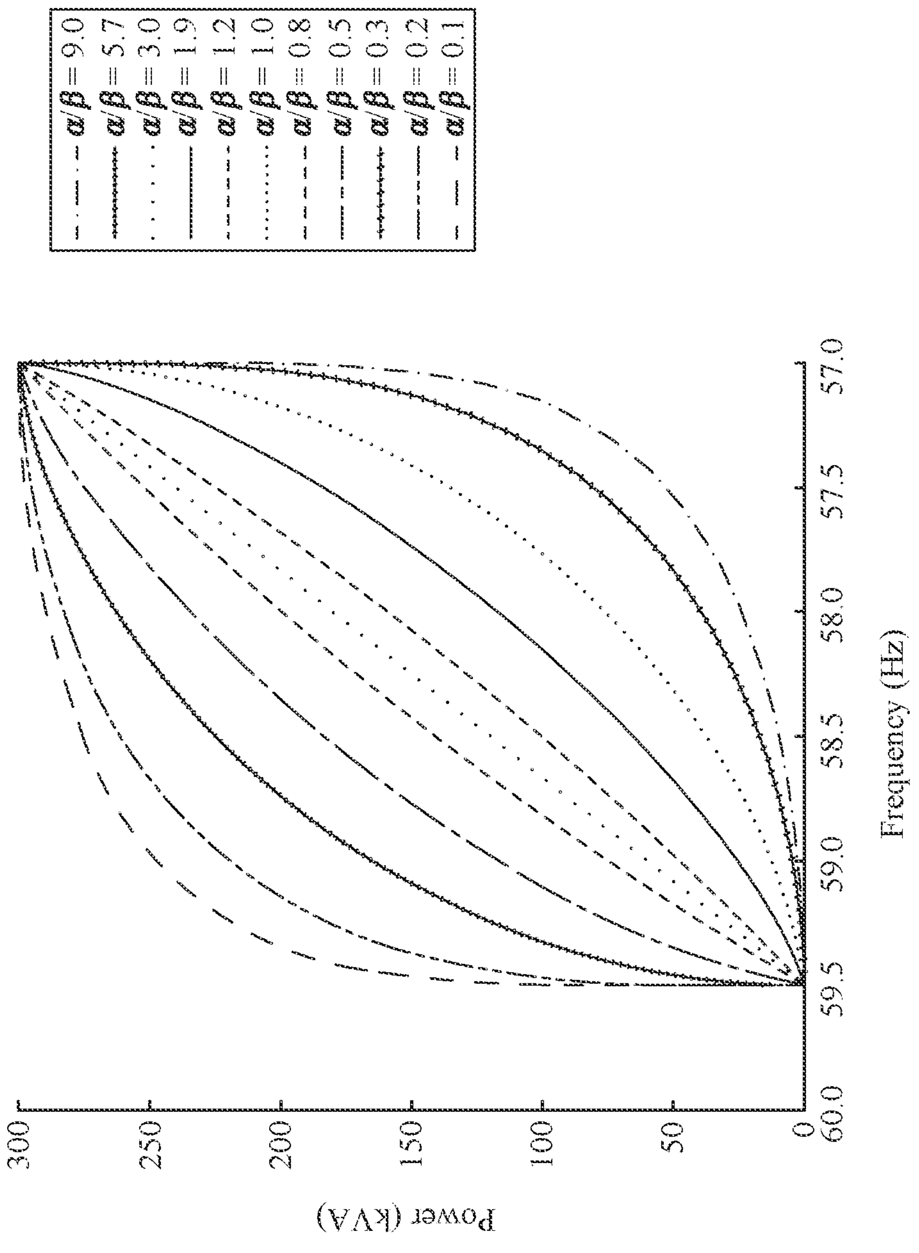
FIG. 7 is a graphical representation of a plurality of response curves according to one embodiment.

Using the normalization process of Equations 6 and 7, FIG. 7 shows a plurality of response curves for a population of load controllers with 300 kVA load for different ratios of $\alpha/\beta$ from 0.1 to 9.0 when $x_{upper}$=59.5 Hz and $x_{lower}$=57.0 Hz.

The mapped value $\alpha/\beta$ that corresponds to the calculated gamma value $\gamma$ of available reserves or resource for PFR determined in Equation 1 is used to select one of the response curves of FIG. 7 that is used to determine the setpoints of the load controllers as discussed below.

The response curves are illustrated with respect to amounts of power (kVA) to be shed by the electric power system for different system frequencies of electrical energy supplied by the electric power system. For example, for a calculated value of $\alpha/\beta$=0.1, the respective curve of FIG. 7 would result in shedding of approximately 250 kVA for a monitored frequency value of the electrical energy being 59.0 Hz, while a calculated value of $\alpha/\beta$=3.0, the respective curve of FIG. 7 would result in shedding of approximately 10 kVA for a monitored frequency value of the electrical energy being 59.0 Hz.

In one embodiment, the control system is configured to use the determined amount of power in reserve (which results in a corresponding value of $\alpha/\beta$) to select one of the response curves and to use the selected response curve to determine the values of the setpoints. The use of the different curves based upon the different values of $\alpha/\beta$ configure the controllers to supply different amounts of the power to the loads at different moments in time for a given value of the parameter being monitored as discussed above.

Figure 8:
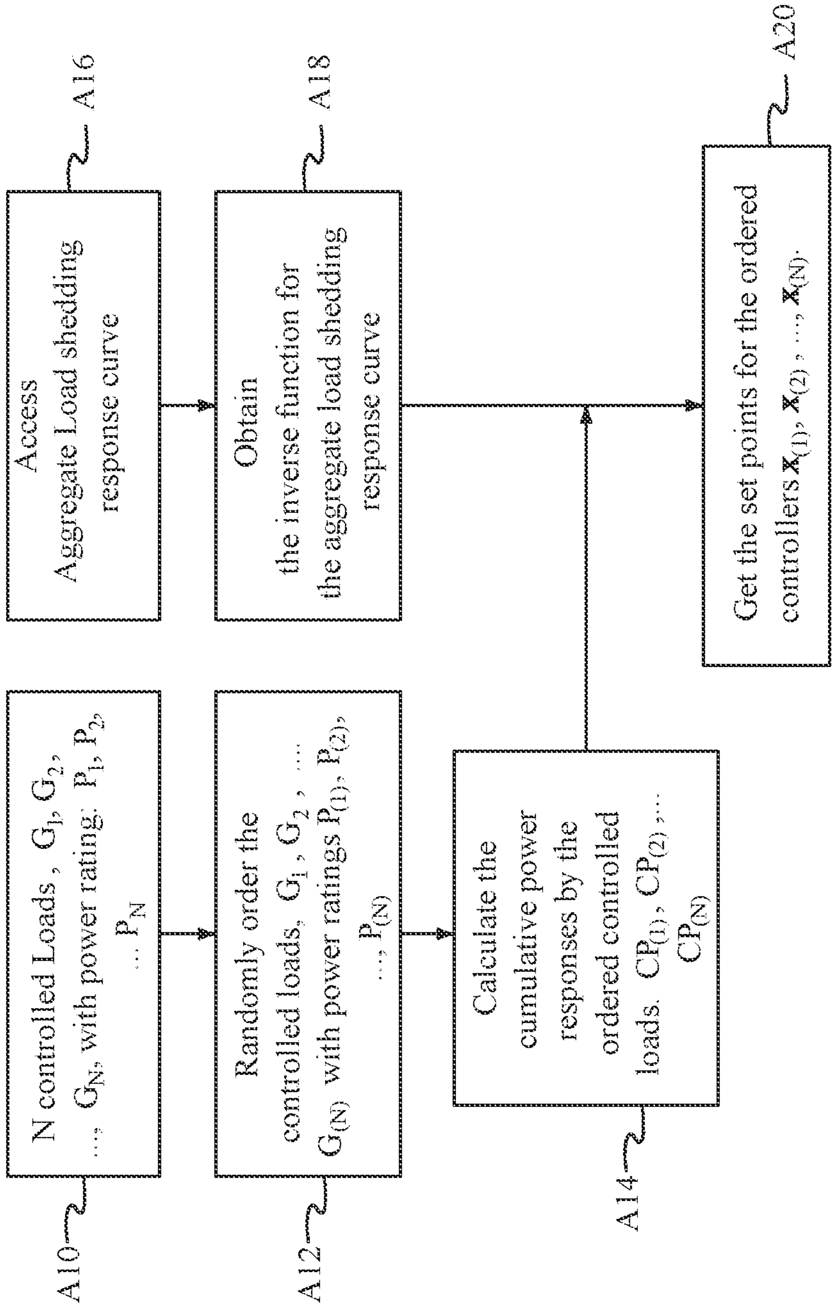
FIG. 8 is a flow chart of an example process for determining load controller setpoints according to one embodiment.

Referring to FIG. 8, an example process for determining the values of the setpoints of the load controllers is shown. In one embodiment, the values of the load controller setpoints are determined that will provide a discretized approximation of the associated response curve selected from FIG. 7. The illustrated process may be executed by the processing circuitry of the control system in one embodiment. Other methods are possible for determining the setpoint values of the load controllers and may include more, less and/or alternative acts.

At an act A10, data regarding N controlled loads G (that are available for load-shedding for example via the load controllers) and power ratings P of the loads G are accessed.

At an act A12, the N controlled loads G are randomly ordered to ensure equal treatment of end-use loads in embodiments where the controlled loads are equally important and the order of the controlled loads to be tripped off or shed is randomly selected in the described embodiment. Provision of a random order of the controlled loads ensures that the load controllers have an equal chance of being engaged for load-shedding over time.

At an act A14, the cumulative power responses by the ordered controlled loads are calculated.

At an act A16, the aggregate load shedding response curve from FIG. 7 is accessed.

At an act A18, the inverse function for the selected aggregate load shedding response curve is obtained.

At an act A20, the inverse function obtained in act A18 and the calculated cumulative power responses calculated in act A14 are used to determine the setpoints for respective ones of the ordered load controllers. The determined setpoints may be communicated to the respective load controllers using the communications system and the setpoints may be used to control load-shedding of the respective load controllers until the setpoints are updated with new setpoints at a subsequent moment in time.

The example method of FIG. 8 is given by Table C.

TABLE C

| | |
|---|---|
| Input: | 1) N load controllers ($G_1, G_2, \ldots G_N$) with power ratings $P_1, P_2, \ldots P_N$; $C_1 = P_1 + P_2 + \cdots + P_N$<br>2) Current reserves for primary frequency response, $\gamma$<br>3) Linear mapping of the value of $\gamma$ to $\alpha/\beta$<br>3) The upper and lower limits for setpoints: $x_u, x_l$ |
| Mapping of Available Reserves to Parameters $\alpha$ and $\beta$: | $\alpha = g_1(\gamma), \beta = g_2(\gamma)$ |
| Aggregate Load Shedding Curve: | $y = f(x; \gamma, x_l, x_u) = C_1 I (x^*; \alpha, \beta, x_1, x_u)$ |
| The inverse of the curve is: | $x = f^{-1}(y; \gamma, x_l, x_u)$ |
| Preprocessing: | Randomly order all the load controllers $G_{(1)}, G_{(2)}, \ldots, G_{(N)}$ with power ratings $P_{(1)}, P_{(2)}, \ldots P_{(N)}$. Denote cumulative power response as CP. |
| $CP_{(1)} = P_{(1)}$<br>$x_{(1)} = f^{-1}(CP_{(1)}; \gamma, x_l, x_u)$<br>for i in 2: N:<br>  $CP_{(i)} = CP_{(i-1)} + P_{(i)}$<br>  $x_{(i)} = f^{-1}(CP_{(i)}; \gamma, x_l, x_u)$<br>end | |

In one illustrative example, the load controllers are randomly ordered and the selected response curve of FIG. 7 is used to select the values of the setpoints of the load controllers. For example, for a first value of the monitored parameter where shedding starts (e.g., 59.4 Hz), the selected response curve is used to identify a corresponding amount of load to be shed. The list of ordered load controllers (and their associated loads) are accessed and one or more of the first ordered load controllers are selected that provide the desired amount of load shedding and the selected one or more load controller(s) are programmed with the respective value of the parameter (e.g., 59.4 Hz) when load shedding occurs.

As discussed above, the amount of power in reserve may change over time which results in different values of $\alpha/\beta$ being calculated at different moments in time which results in the use of different response curves to determine the setpoint values of the load controllers at different moments in time. Accordingly, the use of different response curves at different times along with randomization of the ordering of the load controllers and associated loads results in different setpoint values being used for a given load controller at different moments in time and which configure the given load controller to control the supply of different amounts of power to its respective load at different moments in time for a given value of the monitored parameter. In addition, a given load controller is configured to monitor the parameter of the electrical energy that is supplied by the electric power system with respect to different setpoint values at different moments in time as the values for the load controllers are updated over time.

The setpoint values are updated by determining available reserves and the above-described method of FIG. 8 at different moments in time. According to one embodiment, the individual load controllers locally monitor the parameters of the electrical energy of the electric power system and execute load-shedding locally using the setpoint values of the load controllers and communications are not utilized to achieve frequency control during a transient. As a result, latency or failure in the communications systems may result in usage of sub-optimal setpoints but not a failure of frequency control.

Some of the embodiments herein update the values of load-shedding setpoints of the load controllers at many moments in time and that are used to control the shedding of respective loads and that provide advantages in electric power systems, such as microgrids that may be networked, that dynamically change over time and compared with shedding schemes with static setpoints that might respond properly under one set of system conditions but not others. The adaptive setting of thresholds for load shedding discussed herein is especially applicable to electric power systems with dynamically changing sources of generation and/or loads, such as microgrids.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended aspects appropriately interpreted in accordance with the doctrine of equivalents.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

What is claimed is:

1. An electric power system comprising:

a plurality of load controllers that are configured to control the supply of electrical energy from the electric power system to a plurality of loads;

a control system configured to:

determine an amount of power in reserve and available to be provided to the electric power system; and use the determined amount of power in reserve to determine a plurality of different values of a plurality of setpoints, wherein the setpoints correspond to a parameter of the electrical energy that is supplied by the electric power system to the loads; and wherein the load controllers are configured to monitor the parameter of the electrical energy that is supplied by the electric power system with respect to the values of the setpoints and to adjust an amount of power that is supplied from the electric power system to the loads as a result of the monitoring of the parameter of the electrical energy by the load controllers; and wherein the control system is configured to determine the values of the setpoints using a beta distribution and a sum of alpha and beta of the beta distribution is constrained to equal 2.0.

2. The electric power system of claim 1 wherein the control system is configured to determine the values of the setpoints at an initial moment in time, to determine an amount of power in reserve and available to be provided to the electric power system at a plurality of additional moments in time, and to determine additional values of the setpoints at the additional moments in time.

3. The electric power system of claim 2 wherein the additional values of the setpoints configure the load controllers to supply different amounts of power to the loads at different moments in time for a given value of the parameter of the electrical energy.

4. The electric power system of claim 1 wherein one of the load controllers is configured to monitor the parameter of the electrical energy that is supplied by the electric power system with respect to different ones of the values of the setpoints at different moments in time.

5. The electric power system of claim 1 wherein the determined amount of power in reserve is in addition to an amount of power that is supplied by the electric power system to the loads at a given moment in time.

6. The electric power system of claim 1 wherein the load controllers are configured to reduce the amount of power that is supplied from the electric power system to the loads to adjust the amount of power.

7. The electric power system of claim 1 wherein the determined amount of power in reserve is greater at a first moment in time compared with a second moment in time, and the determined values of the setpoints configure the load controllers to increase a reduction in the amount of power that is supplied from the electric power system to the loads for a given value of the parameter of the electrical energy at the second moment in time compared with a reduction in the amount of power that is supplied from the electric power system to the loads for the given value of the parameter of the electrical energy at the first moment in time.

8. The electric power system of claim 1 wherein the control system is configured to use the determined amount of power in reserve to select one of a plurality of response curves and to use the selected response curve to determine the values of the setpoints.

9. The electric power system of claim 1 wherein the control system is configured to use at least one of headroom of generation sources, a largest planned transient, and the loads of the electric power system to determine the determined amount of power in reserve.

10. The electric power system of claim 1 wherein the control system is configured to map the determined amount of power in reserve to a ratio of alpha and beta of the beta distribution to determine the values of the setpoints.

11. The electric power system of claim 1 further comprising a plurality of microgrids that are selectively connected to one another to conduct electrical energy between the microgrids, and wherein the control system is configured to determine the determined amount of power in reserve and determine the values of the setpoints after one of connection or disconnection of the microgrids with respect to one another.

12. The electric power system of claim 11 further comprising a communications system configured to communicate data regarding amounts of power in reserve at the microgrids to the control system.

13. The electric power system of claim 1 further comprising a communications system configured to communicate the values of the setpoints from the control system to the load controllers.

14. The electric power system of claim 1 wherein the parameter of the electrical energy is frequency and at least one of the load controllers is configured to reduce the amount of power that is supplied from the electric power system to at least one of the loads as a result of the frequency of the electrical energy that is supplied by the electric power system dropping below at least one of the values of the setpoints.

15. The electric power system of claim 1 wherein the loads are end user loads connected with a distribution system of the electric power system.

16. The electric power system of claim 1 wherein each of the load controllers is configured to adjust the amount of power that is supplied from the electric power system to an individual one of the loads.

17. The electric power system of claim 1 wherein the control system is configured to determine the values of the setpoints as a result of a change in an amount of generation of the electrical energy of the electric power system or a change in the loads that receive the electric energy from the electric power system.

18. The electric power system of claim 1 wherein the load controllers are configured to adjust the amount of power to provide a desired primary frequency response of the electric power system.

19. The electric power system of claim 1 wherein the control system is configured to determine the values of the setpoints to provide a desired response of the electric power system.

20. The electric power system of claim 1 wherein the load controllers are configured to adjust the amount of power that is supplied in a plurality of different microgrids of the electric power system.

21. The electric power system of claim 20 wherein the control system is configured to determine the different values of the setpoints after one of connection or disconnection of the microgrids with respect to one another.

22. The electric power system of claim 1 wherein the control system is configured to determine the different values of the setpoints after a change in an amount of generation of the electrical energy of the electric power system.

23. The electric power system of claim 1 wherein the control system is configured to determine the different values of the setpoints after a change in the loads that receive the electric energy from the electric power system.

24. The electric power system of claim 1 wherein the setpoints correspond to respective ones of the load controllers.

25. The electric power system of claim 24 wherein at least some of the values of the setpoints are different from one another at a moment in time.

26. The electric power system of claim 1 wherein the different values of the setpoints are a first set of values at one moment in time and the control system is configured to determine a second set of values of the setpoints at another moment in time, and wherein at least some of the values of the setpoints of the first and second sets are different.

27. The electric power system of claim 24 wherein the load controllers are individually configured to adjust the amount of power that is supplied to a respective one of the loads.

28. The electric power system of claim 24 wherein the parameter of the electrical energy corresponds to frequency of the electrical energy and one of the load controllers is configured to reduce the amount of power that is supplied from the electric power system to at least one of the loads as a result of the frequency of the electrical energy being monitored by the one load controller being less than the value of the respective setpoint for the one load controller.

29. The electric power system of claim 24 wherein the parameter of the electrical energy corresponds to voltage of the electrical energy and one of the load controllers is configured to reduce the amount of power that is supplied from the electric power system to at least one of the loads as a result of the voltage of the electrical energy being monitored by the one load controller being less than the value of the respective setpoint for the one load controller.

30. An electric power system comprising:

a plurality of load controllers that are configured to control the supply of electrical energy from the electric power system to a plurality of loads;

a control system configured to:

determine an amount of power in reserve and available to be provided to the electric power system; and use the determined amount of power in reserve to determine a plurality of different values of a plurality of setpoints, wherein the setpoints correspond to a parameter of the electrical energy that is supplied by the electric power system to the loads;

wherein the load controllers are configured to monitor the parameter of the electrical energy that is supplied by the electric power system with respect to the values of the setpoints and to adjust an amount of power that is supplied from the electric power system to the loads as a result of the monitoring of the parameter of the electrical energy by the load controllers; and wherein the control system is configured to determine the values of the setpoints using a beta distribution and to map the determined amount of power in reserve to a ratio of alpha and beta of the beta distribution to determine the values of the setpoints.

* * * * *